United States Patent
Yamamoto et al.

[11] Patent Number: 5,879,255
[45] Date of Patent: Mar. 9, 1999

[54] CHAIN TENSIONER

[75] Inventors: Ken Yamamoto, Iwata; Katsuhisa Suzuki, Hamamatsu, both of Japan

[73] Assignee: NTN Corporation, Osaka, Japan

[21] Appl. No.: 843,594

[22] Filed: Apr. 16, 1997

[30] Foreign Application Priority Data

| Apr. 17, 1996 | [JP] | Japan | 8-095011 |
| Jun. 26, 1996 | [JP] | Japan | 8-165615 |
| Jun. 28, 1996 | [JP] | Japan | 8-168996 |
| Jul. 11, 1996 | [JP] | Japan | 8-181892 |

[51] Int. Cl.⁶ ........................ F16H 7/08
[52] U.S. Cl. ............... 474/110; 474/101; 474/135; 474/138
[58] Field of Search ............... 474/110, 138, 474/135, 101, 111, 109; 74/459

[56] References Cited

U.S. PATENT DOCUMENTS

| 5,154,091 | 10/1992 | Bianco | 74/459 |
| 5,383,813 | 1/1995 | Odai | 474/110 |
| 5,632,474 | 5/1997 | Hayakawa et al. | 474/110 X |
| 5,637,047 | 6/1997 | Schulze | 474/110 |
| 5,704,860 | 1/1998 | Stief | 474/110 |
| 5,713,809 | 2/1998 | Yamamoto | 474/110 |

FOREIGN PATENT DOCUMENTS 64-25557  2/1989  Japan.

*Primary Examiner*—Charles A. Marmor
*Assistant Examiner*—Marcus Charles
*Attorney, Agent, or Firm*—Wenderoth, Lind & Ponack, L.L.P.

[57] ABSTRACT

A chain tensioner including a housing having a cylinder chamber, a rod member in the form of a threaded shaft inserted in the cylinder chamber for tensioning a chain, a tension adjusting spring for biasing the rod member outwardly of the housing, a hydraulic damper for damping axial dynamic load applied to the rod member from the chain by utilizing as a damping medium a hydraulic oil supplied into a closed end of the cylinder chamber through an oil supply passage formed in the housing and a check valve, and a thread engagement arrangement for preventing the rod member from retracting under an axial static load applied to the rod member. The chain tensioner can prevent the entry of air in the pressure chamber of the hydraulic damper when the engine is started in a cold environment or restarted.

10 Claims, 4 Drawing Sheets

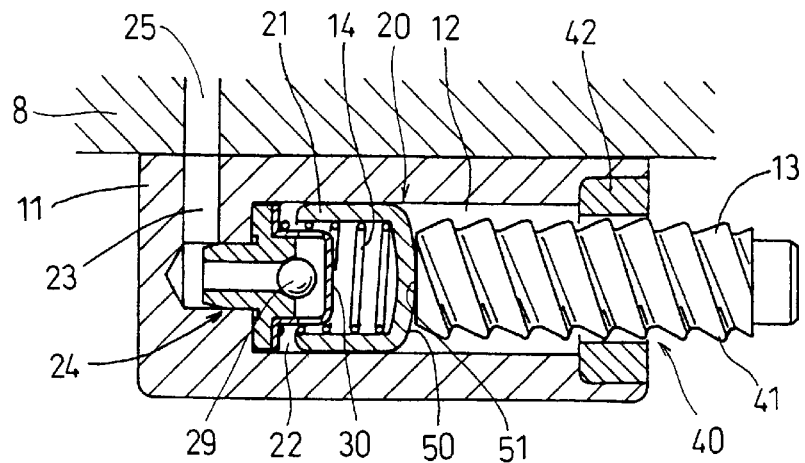
FIG. 2
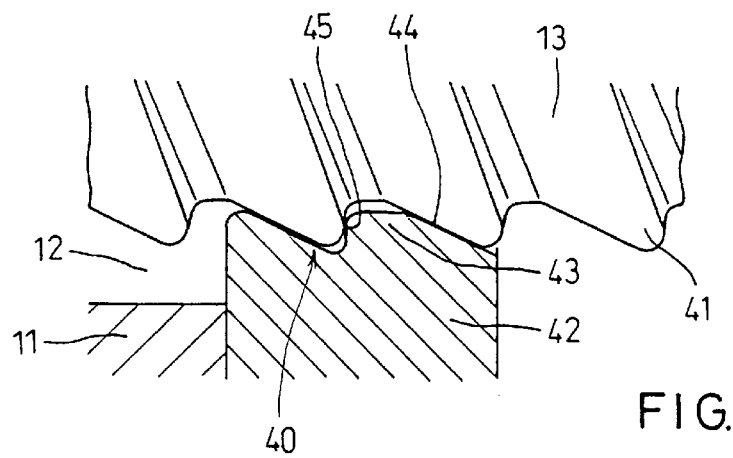
FIG. 3
FIG. 4
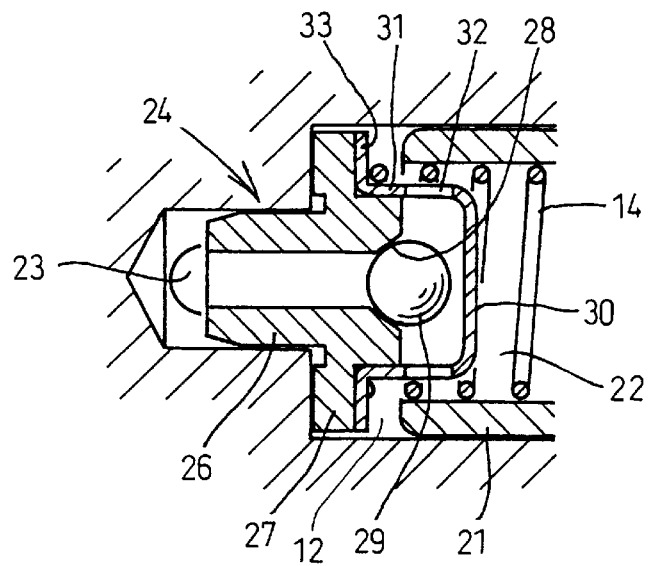

CHAIN TENSIONER

BACKGROUND OF THE INVENTION

This invention relates to a chain tensioner for keeping constant the tension in a chain such as a camshaft drive chain.

FIG. 9 shows a conventional chain tensioner of this type. It includes a plunger 62 and a tension adjusting spring 63 both mounted in a cylinder chamber 61 formed in a housing 60. The spring 63 biases the plunger 62 outwardly to press it against a chain 64.

Behind the plunger 62 is a pressure chamber 65 to which an oil supply passage 66 opens. A check valve 67 is provided near the oil supply passage 66. When the plunger 62 moves outward so that the pressure in the pressure chamber 65 drops, the check valve 67 opens and simultaneously an oil supply pump is activated to supply hydraulic oil through the oil supply passage 66 into the pressure chamber 65.

When the tension in the chain 64 increases and the plunger 62 is pushed into the housing 60, the hydraulic oil sealed in the pressure chamber 65 serves as a damper, damping the movement of the plunger 62. As the chain 64 slackens, the tension adjusting spring 63 pushes out the plunger 62 quickly to increase the tension in the chain 64. The plunger 62 can smoothly move following fluctuating tension in the chain 64, thus keeping the tension in the chain at a constant level at all times.

In the case of a camshaft drive chain, its tension may increase when the engine is stopped according to the positions of the cams on the camshafts when they are stopped. The chain 64 thus urges the plunger 62 into the housing 60, increasing the oil pressure in the pressure chamber 65. The oil in the chamber 65 thus gradually leaks through a gap present between the sliding surfaces of the plunger 62 and the cylinder chamber 61, thus keeping the plunger 62 retracted.

When the engine is restarted in this state and the chain 64 slackens, the plunger 62 will move a long distance outwardly. Since the engine has just been started, the oil supply pump is not sufficiently warmed up and cannot discharge a sufficient amount of oil into the pressure chamber 65. Thus, air may find its way into the pressure chamber, impairing the damping performance of the chain tensioner.

Also, immediately after the engine has been started, the oil is high in viscosity and low in fluidity. This also is a potential cause of the above problem.

In order to solve this problem, Unexamined Japanese Utility Model Publication 64-25557 proposes to provide the housing with pivotable ratchet pawls to prevent the plunger from being pushed into the housing when the engine is cut, by bringing the ratchet pawls provided on the housing into engagement with a rack provided on the outer periphery of the plunger. But this arrangement has the problem of durability because a load from the chain concentrates on the portion where the rack engages the ratchet pawl. Also, if the teeth on the racks are arranged at a small pitch, the backlash will disappear, causing the chain to be overstretched. If the pitch is large, the backlash will grow large. The chain will thus flap violently when the engine is started until the hydraulic damper is activated.

An object of this invention is to provide a durable, high-quality chain tensioner which has means for preventing air from entering hydraulic oil in the pressure chamber when the fluidity of hydraulic oil is low such as when the engine is started in a cold environment, and which produces less noise.

SUMMARY OF THE INVENTION

According to this invention, there is provided a chain tensioner comprising a housing having a cylinder chamber, a rod member having a rear end thereof inserted in the cylinder chamber for tensioning a chain, a tension adjusting spring for biasing the rod member outwardly of the housing, an oil supply type hydraulic damper for damping axial dynamic load applied to the rod member from the chain by utilizing as a damping medium a hydraulic oil supplied into a closed end of the cylinder chamber through an oil supply passage formed in the housing and a check valve, and a thread engagement means for preventing the rod member from retracting under an axial static load applied to the rod member, the check valve comprising a cylindrical valve seat inserted in an oil outlet of the oil supply passage and having a flange formed on the outer periphery thereof so as to abut the closed end of the cylinder chamber, a check ball provided to be movable into and out of contact with an oil outlet of the valve seat, and a retainer having its mounting position restrained by coming into abutment with the flange for restricting the movement of the check ball.

In a preferred arrangement, the thread engagement means has threads each having a pressure flank for bearing an axial pushing force applied to the rod member and a clearance flank, the threads having the shape of serrations with the pressure flank having a greater flank angle than the clearance flank, the serration-shaped threads having such a lead angle that the rod member can be moved outwardly under the force of the pressure adjusting spring.

The rod member may be a threaded shaft. The threaded shaft is threaded into a nut member press-fitted in an opening of the cylinder chamber.

The hydraulic damper may comprise a plunger slidably mounted in the cylinder chamber, a pressure chamber defined behind the plunger, an oil supply passage formed in the housing communicating with the pressure chamber, and a check valve provided near the oil outlet of the oil supply passage for closing the oil supply passage when the pressure in the pressure chamber becomes higher than the oil pressure in the oil supply passage.

In this arrangement, the tension adjusting spring biases the rod member outwardly to press the pivotable slipper against the chain.

When the engine is cut, the chain may be stretched according to the positions of the cams on the camshafts when they stop. If this happens, a pushing force is applied to the rod member from the chain. But since such pushing force is borne by the thread engagement means, the rod will not retract, so that the chain is kept stretched.

Thus, when the engine is restarted, the chain will not slacken so markedly, so that the rod will not protrude so markedly. This prevents the entry of air into the hydraulic oil in the hydraulic damper.

Other features and objects of the present invention will become apparent from the following description made with reference to the accompanying drawings, in which:

BRIEF DESCRIPTION OF THE DRAWINGS

FIG. 2 is a plan view in cross-section of FIG. 1;

FIG. 3 is an enlarged sectional view of a portion of the same where the threaded shaft engages in the nut member;

FIG. 4 is an enlarged sectional view of a portion of the same where the check valve is mounted;

DETAILED DESCRIPTION OF THE PREFERRED EMBODIMENT

Embodiments of this invention will now be described with reference to FIGS. 1–7.

Figure 1:
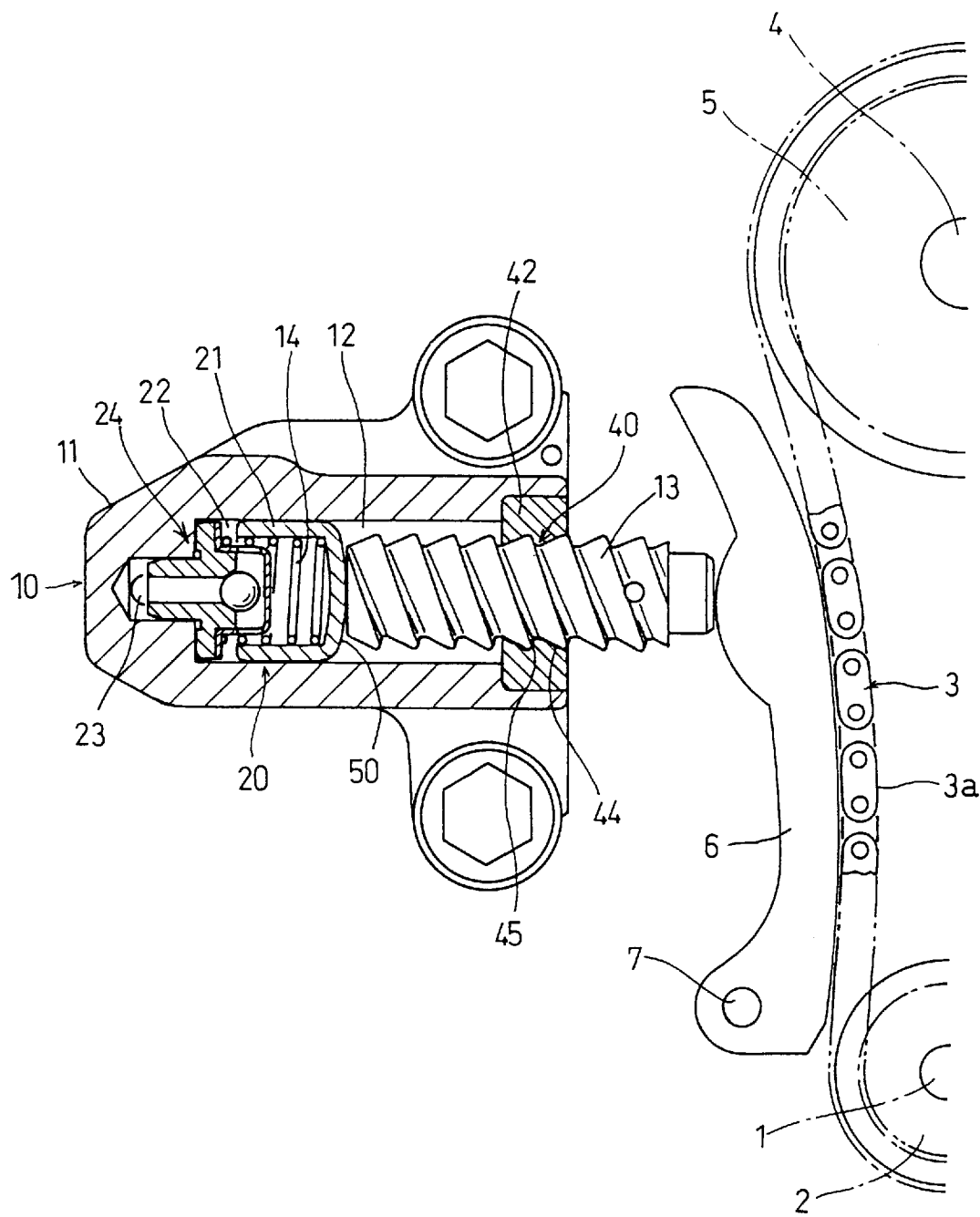
FIG. 1 is a sectional view of an embodiment of this invention.

FIG. 1 shows a chain system for driving a camshaft of an internal combustion engine. The engine has a crankshaft 1 carrying a sprocket 2 at one end. A chain 3 transmits the rotation of the sprocket 2 to a sprocket 5 mounted on one end of a camshaft 4.

The chain system has a slipper 6 pivotable about a shaft 7 and pressed against a slack side 3a of the chain 3. A chain tensioner 10 biases the slipper 6 against the chain 3 to stretch the chain.

As shown in FIGS. 1 and 2, the chain tensioner 10 has a housing 11 fixed to the wall surface of a crank chamber formed in a cylinder block 8. The housing 11 has a cylinder chamber 12 having an open end facing the slipper 6. A rod member 13 has its rear end inserted in the cylinder chamber 12 through its open end.

A tension adjusting spring 14 mounted in the cylinder chamber 12 biases the rod member 13 outwardly to press the slipper 6 against the chain 3, thus stretching it.

While the engine is in operation, the tension in the chain keeps fluctuating, so that a dynamic load is applied from the chain 3 to the rod member 13. When the engine is cut, the chain 3 may be stretched according to the positions of the cams on the camshaft 4 when they stop. In this state, a static load will be applied to the rod member 13 from the chain 3.

Any dynamic load applied to the rod member 13 is damped by an oil supply type hydraulic damper 20. Any static load applied to the rod member 13 is borne by a thread engagement mechanism 40, so that static load cannot retract the rod member 13.

The hydraulic damper 20 comprises a plunger 21 mounted in the cylinder chamber 12 behind the rod member 13 so as to be slidable along the inner surface of the cylinder chamber 12. A pressure chamber 22 is defined behind the plunger 21 to which an oil supply passage 23 opens. A check valve 24 is provided near the passage 23.

The oil supply passage 23 communicates with an oil passage 25 formed in the cylinder block 8. A hydraulic pump, not shown, is connected to the passage 25. Hydraulic oil is supplied into the pressure chamber 22 by activating the hydraulic pump.

Referring to FIG. 4, the check valve 24 includes a cylindrical valve seat 26 loosely fitted in the outlet of the oil supply passage 23 and having a flange 27 formed on the outer periphery thereof and brought into abutment with the closed end of the cylinder chamber 12. The valve seat 26 has a tapered surface 28 formed around its oil outlet end. A check ball 29 is retained in a retainer 30 so as to be movable into and out of contact with the tapered surface 28.

The retainer 30 comprises a cup portion 31 covering the check ball 29 and formed with an oil hole 32, and a flange 33 provided around the edge of the opening of the cup portion 31. The mounting position of the retainer 30 is restricted by having its cup portion 31 fitted around the end of the valve seat 26 and its flange 33 into abutment with the flange 27 of the valve seat 26.

The rod member 13 is a threaded shaft that constitutes a part of the thread engagement mechanism 40. The rod member, that is, threaded shaft 13 has its male threads 41 threadedly engaged in a cylindrical nut 42 press-fitted in the opening of the cylinder chamber 12.

Figure 5:
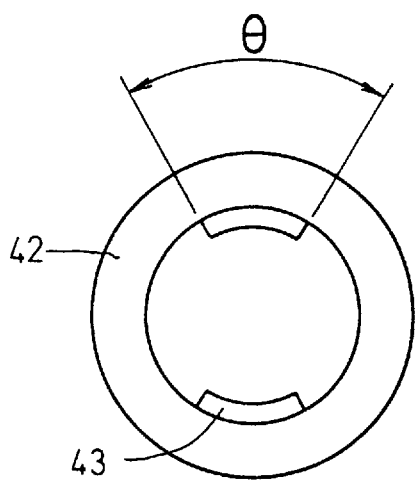
FIG. 5 is a front view of the nut member.

FIG. 5 shows the nut member 42 in detail. It is formed by sintering and has female threads 43 formed on its inner periphery at diametrically opposite positions. Each female thread 43 should extend along an angular range θ not exceeding 60°. If it exceeds 60°, the material density of the nut tends to be uneven at the portions where the female threads 43 are formed when the nut is formed by sintering. The female threads 43 thus formed tend to be low in strength.

As shown in FIG. 3, the female threads 43 and the male threads 41 formed on the outer periphery of the rod member 13 have the shape of serrations, with the angle of the pressure flank 44, i.e. the flank on which the pushing force from the rod member 13 acts, greater than the angle of the clearance flank 45.

The flank angles and lead angles of the threads are determined so that the mechanism 40 permits smooth outward movement of the rod member 13 under the force of the tension adjusting spring 14. For the movement of the rod member 13 in the retracting direction, the mechanism 40 checks such movement under static load. But when dynamic load is applied to the rod member 13 due to vibration of the chain, the rod member can gradually retract while rotating in the threaded hole until the dynamic load applied to the rod member 13 balances with the force of the tension adjusting spring 14.

Referring to FIG. 1, the tension in the chain 3 fluctuates while it is transmitting the rotation of the crankshaft 1 to the camshaft 4. When the tension in the slack side 3a of the chain 3 decreases, the rod member 13 protrudes outward biased by the tension adjusting spring 14.

Since the flank angle and the lead of the clearance flanks 45 are determined such that the mechanism 40 allows free movement of the rod member 13 in the protruding direction, the rod member can quickly protrude outwardly while rotating to press the slipper 6 against the chain. Slackening of the slack side 3a of the chain thus disappears instantly. When the force applied to the rod member 13 from the chain balances with the force of the tension adjusting spring 14, the rod member 13 stops.

While the rod member 13 is moving outwardly, the plunger 21 also moves outwardly together with the rod member 13. The pressure in the pressure chamber 22 thus drops. This opens the check valve 24, so that hydraulic oil flows into the pressure chamber 22 through the oil supply passage 23.

When the rod member 13 moves outward, it moves axially while rotating with its end in contact with the end face of the plunger 21. If the contact resistance between the rod member 13 and the plunger 21 is large, the rod member 13 cannot smoothly rotate nor move axially.

It is therefore preferable to minimize the contact resistance between the rod member 13 and the plunger 21 by having them in point contact with each other. For this purpose, the plunger 21 of the embodiment has a convex spherical end face 50 which is brought into point contact with a flat end face 51 of the rod member 13. But both the plunger 21 and the rod member 13 may have convex spherical end faces.

When the tension in the slack side 3a of the chain 3 increases due to torque fluctuation, a pushing force is applied from the chain to the rod member 13 through the slipper 6. Since this pushing force is a dynamic load, the rod member 13 can rotate smoothly in the nut while keeping its male threads 41 in engagement with the female threads 43 of the nut 42. The pushing force applied to the rod member 13 is thus transmitted to the plunger 21.

This increases the pressure in the pressure chamber 22. The oil supply passage 23 is thus closed by the check valve 25, and the pushing force is damped by the hydraulic oil sealed in the pressure chamber 22.

While the pushing force is greater than the force of the tension adjusting spring 14, hydraulic oil in the pressure chamber 22 flows through a gap between the sliding surfaces of the cylinder chamber 12 and the plunger 21 into the front side of the cylinder chamber 12, allowing the rod member 13 and the plunger 21 to retract until the pushing force balances with the force of the tension adjusting spring 14.

When the engine is cut, the slack side 3a of the chain 3 may be stretched according to the positions of the cams on the camshaft 4 when they stop. In such a case, a pushing force resulting from the increased chain tension will be applied to the rod member 13. This force, which is a static load, is borne by the pressure flanks 44 of the female threads 43 on the nut member 42 and the male threads 41 on the rod member 13 at their portions in threaded engagement with each other. In this state, the rod member 13 cannot retract because the flank angle and the lead of the pressure flanks 44 are determined such that the mechanism 40 checks the retracting movement of the rod member under static pushing force.

Thus, when the engine is restarted, the slack side 3a of the chain 3 will not slacken so markedly. The rod member 13 is thus held at a substantially constant position, so that the pressure in the pressure chamber 22 drops little. This prevents the entry of air into the pressure chamber 22.

Since the oil viscosity is high immediately after the engine is started in a cold environment, oil will not flow smoothly into the pressure chamber 12. But because the rod member 13 does not protrude so much, no air will enter the pressure chamber 22.

Figure 6:
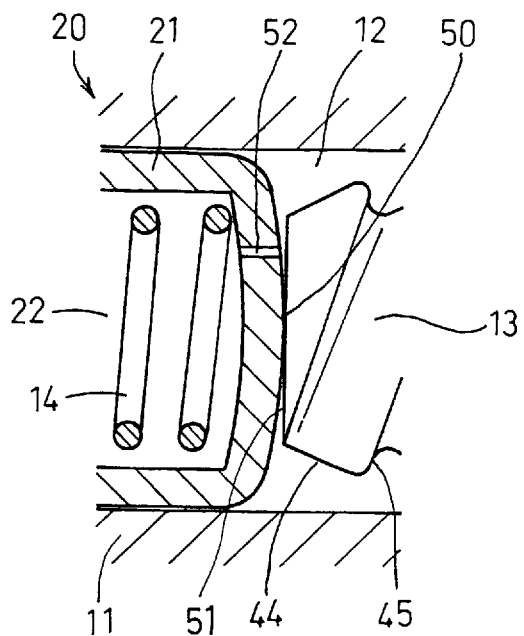
FIG. 6 is a sectional view of means for venting air that has penetrated into the pressure chamber.

As shown in FIG. 6, a plurality of vent holes 52 may be formed in the end of the plunger 21 around the contact portion with the rod member 13 to discharge any air that may enter the pressure chamber 22 or air that separates from the oil in the pressure chamber, into the cylinder chamber 12 through the vent holes 52 when the plunger 21 is retracted due to being pushed by the chain 3. The hydraulic damper 20 can thus maintain high damping properties.

Figure 7:
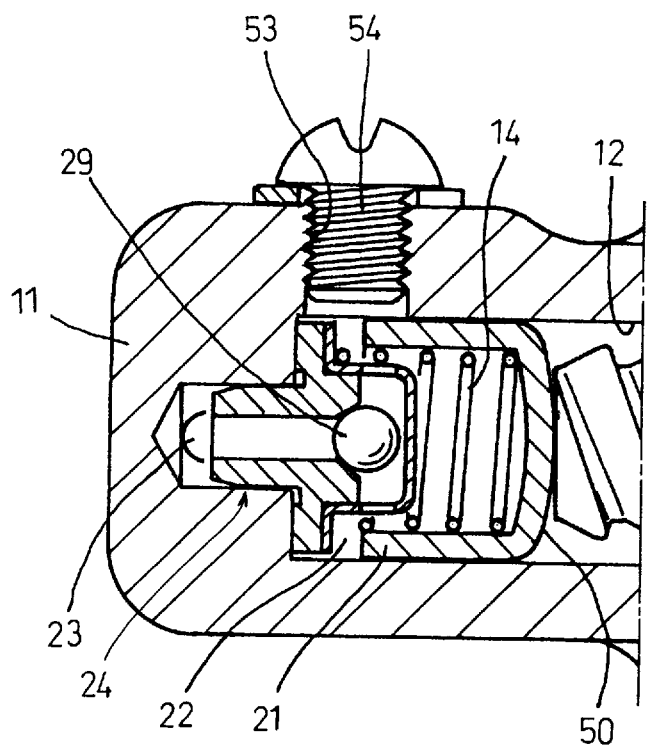
FIG. 7 is a sectional view of another air vent means.
Figure 8:
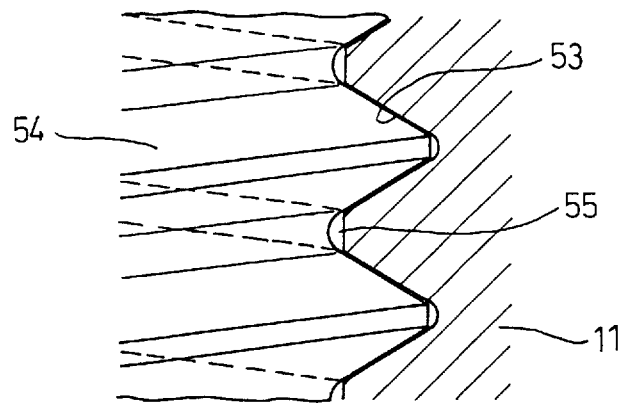
FIG. 8 is a partial enlarged view of FIG. 7.
Figure 9:
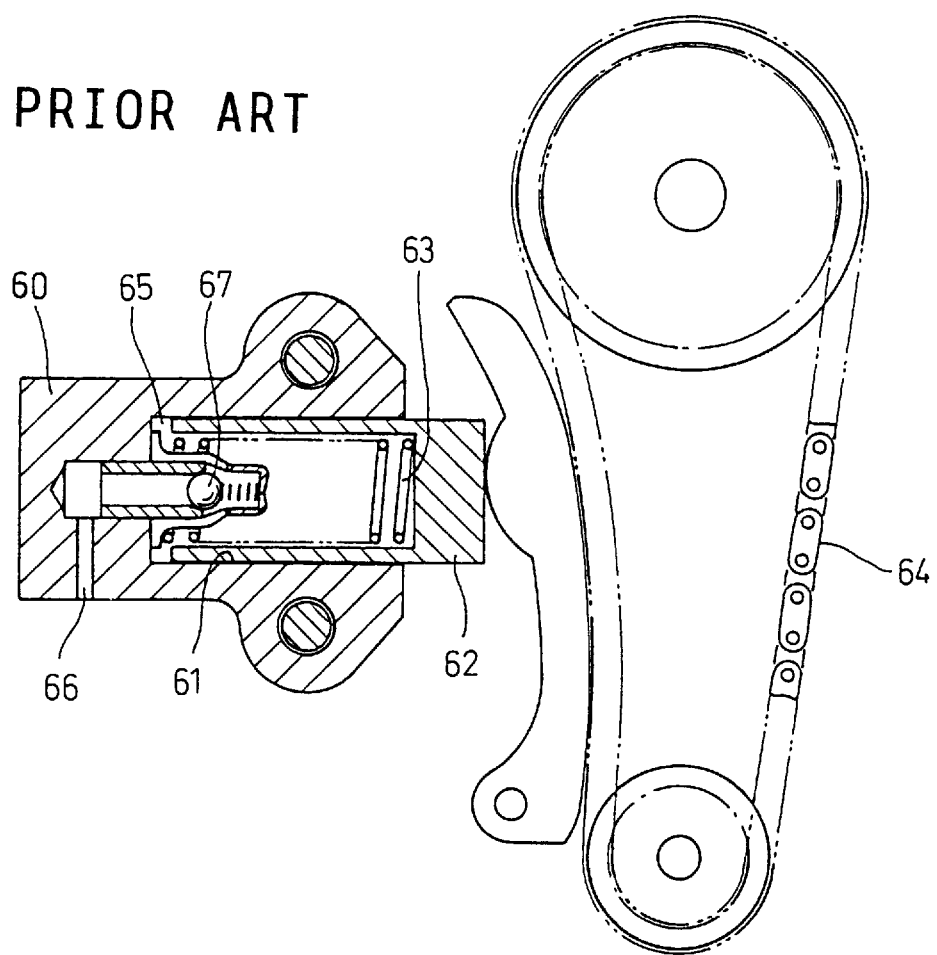
FIG. 9 is a sectional view of a conventional chain tensioner.

FIGS. 7 and 8 show a different type of vent means for venting air in the pressure chamber 22. This means comprises a threaded hole 53 opening to the top surface of the housing 11 and the pressure chamber 22, and a screw 54 threaded into the threaded hole 53 to leave a small gap 55 between the threads on the hole 53 and the screw 54. When the plunger 21 retracts, any air in the pressure chamber 22 is discharged through the gap 55.

To assemble the chain tensioner shown in FIGS. 1 and 2, the check valve 24 and then the tension adjusting spring 14 and the plunger 21 are mounted in the housing 11, the nut member 42 is press-fitted, and finally the rod member 13 is threaded into the nut 42.

In mounting the check valve 24, if a cylindrical valve seat is press-fitted in the oil supply passage 23, burrs tend to be produced on the inner periphery of the oil supply passage 23 or on the outer periphery of the valve seat. Such burrs may cause oil leakage. Also, the degree of press-fitting of the valve seat will be uneven, which may in turn make the stroke amount of the check ball vary from one chain tensioner to another. This makes it difficult to provide a uniform-performance, high-quality chain tensioner.

In the embodiment, since the valve seat 26 is loosely fitted in the oil supply passage, no burrs will be produced. Since the flange 27 of the valve seat 26 is brought into close contact with the closed end of the cylinder chamber 12, there will be no oil leakage.

Since the valve seat 26 and the retainer 30 have their flanges 27 and 33 in abutment with each other, the mounting position of each of the valve seat and the retainer is restrained by the other. Thus, there is no need to provide a separate means for controlling the amount of stroke of the check ball 29.

According to this invention, the rod member is biased outwardly by the tension adjusting spring. Dynamic load applied to the rod member is damped by the hydraulic damper. The rod member can thus move smoothly following fluctuating chain tension, so that the tension in the chain is always kept constant.

Static load applied to the rod member is borne by the thread engagement means. Thus, even if the chain is stretched when the engine is cut according to the positions of the cams when they stop, the rod member will not retract. The chain is thus kept stretched.

When the engine is restarted, the chain will not slacken so markedly and the rod will protrude little even in a cold environment. It is thus possible to prevent the entry of air into the pressure chamber. The chain tensioner can thus maintain high performance.

What is claimed is:

1. A chain tensioner comprising a housing having a cylinder chamber, a rod member having a rear end thereof inserted in said cylinder chamber, a tension adjusting spring biasing said rod member outwardly of said housing, an oil supply type hydraulic damper for damping axial dynamic load applied to said rod member from the chain by utilizing as a damping medium a hydraulic oil supplied into a closed end of said cylinder chamber through an oil supply passage formed in said housing and a check valve, and a thread engagement means for preventing said rod member from retracting under an axial static load applied to said rod member, said check valve comprising a cylindrical valve seat inserted in an oil outlet of said oil supply passage and having a flange formed on the outer periphery thereof so as to abut the closed end of said cylinder chamber, a check ball provided to be movable into and out of contact with an oil outlet of said valve seat, and a retainer having its mounting position restrained by coming into abutment with said flange for restricting the movement of said check ball.

2. A chain tension as claimed in claim 1 wherein said thread engagement means has threads each having a pressure flank for bearing an axial pushing force applied to said rod member and a clearance flank, said threads being serration-shaped with said pressure flank having a greater flank angle than said clearance flank, said serration-shaped threads having such a lead angle that said rod member can be moved outwardly under the force of said pressure adjusting spring.

3. A chain tensioner as claimed in claim 1 wherein said rod member is a threaded shaft, and wherein said thread engagement means comprises said threaded shaft and a cylindrical nut member press-fitted in an opening of said cylinder chamber.

4. A chain tensioner as claimed in claim 3 wherein said nut member comprises a sintered nut member formed with female threads in the inner periphery thereof at positions diametrically opposite to each other, said female threads being in threaded engagement with said threaded shaft.

5. A chain tensioner as claimed in claim 1 wherein said hydraulic damper comprises a plunger slidably mounted in said cylinder chamber, a pressure chamber defined behind said plunger, said oil supply passage formed in said housing communicating with said pressure chamber, and said check valve provided near said oil outlet of said oil supply passage for closing said oil supply passage when the pressure in said pressure chamber becomes higher than the oil pressure in said oil supply passage.

6. A chain tensioner as claimed in claim 5 wherein said plunger and said rod member are in point contact with each other.

7. A chain tensioner as claimed in claim 2 wherein said rod member is a threaded shaft, and wherein said thread engagement means comprises said threaded shaft and a cylindrical nut member press-fitted in an opening of said cylinder chamber.

8. A chain tensioner as claimed in claim 2 wherein said hydraulic damper comprises a plunger slidably mounted in said cylinder chamber, a pressure chamber defined behind said plunger, said oil supply passage formed in said housing communicating with said pressure chamber, and said check valve provided near said oil outlet of said oil supply passage for closing said oil supply passage when the pressure in said pressure chamber becomes higher than the oil pressure in said oil supply passage.

9. A chain tensioner as claimed in claim 3 wherein said hydraulic damper comprises a plunger slidably mounted in said cylinder chamber, a pressure chamber defined behind said plunger, said oil supply passage formed in said housing communicating with said pressure chamber, and said check valve provided near said oil outlet of said oil supply passage for closing said oil supply passage when the pressure in said pressure chamber becomes higher than the oil pressure in said oil supply passage.

10. A chain tensioner as claimed in claim 4 wherein said hydraulic damper comprises a plunger slidably mounted in said cylinder chamber, a pressure chamber defined behind said plunger, said oil supply passage formed in said housing communicating with said pressure chamber, and said check valve provided near said oil outlet of said oil supply passage for closing said oil supply passage when the pressure in said pressure chamber becomes higher than the oil pressure in said oil supply passage.

* * * * *